US009953260B1

United States Patent
Nugent

(10) Patent No.: US 9,953,260 B1
(45) Date of Patent: *Apr. 24, 2018

(54) SYSTEM FOR AHAH-BASED FEATURE EXTRACTION OF SURFACE MANIFOLDS

(71) Applicant: KnowmTech, LLC, Albuquerque, NM (US)

(72) Inventor: Alex Nugent, Santa Fe, NM (US)

(73) Assignee: KnowmTech, LLC, Santa Fe, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,871

(22) Filed: Jan. 3, 2017

Related U.S. Application Data

(63) Continuation of application No. 15/057,184, filed on Mar. 1, 2016, now Pat. No. 9,589,238, which is a continuation of application No. 13/613,700, filed on Sep. 13, 2012, now Pat. No. 9,280,748.

(60) Provisional application No. 61/663,264, filed on Jun. 22, 2012.

(51) Int. Cl.
*G06F 17/00* (2006.01)
*G06N 3/04* (2006.01)
*G06K 9/62* (2006.01)

(52) U.S. Cl.
CPC ........... *G06N 3/049* (2013.01); *G06K 9/6232* (2013.01)

(58) Field of Classification Search
CPC ......... G06N 3/049; G06N 3/08; G06K 9/6232
USPC ............................................... 706/1, 12, 45
See application file for complete search history.

(56) References Cited

U.S. PATENT DOCUMENTS

| 5,680,481 | A  | 10/1997 | Prasad et al. |
| 5,794,224 | A  | 8/1998  | Yufik |
| 6,308,155 | B1 | 10/2001 | Kingsbury et al. |
| 6,889,216 | B2 | 5/2005  | Nugent |
| 6,910,010 | B2 | 6/2005  | Iwahashi et al. |
| 6,995,649 | B2 | 2/2006  | Nugent |
| 7,028,017 | B2 | 4/2006  | Nugent |

(Continued)

FOREIGN PATENT DOCUMENTS

EP  1 483 737 B1  3/2011

OTHER PUBLICATIONS

Ananthanarayanan, R. et al., "The Cat is Out of the Bag: Cortical Simulations with 109 Neurons, 1013 Synapses," SCO9 Nov. 14-20, 2009, Portland, Oregon, 12 pages.

(Continued)

*Primary Examiner* — David Vincent
(74) *Attorney, Agent, or Firm* — Kermit D. Lopez; Luis M. Ortiz; Ortiz & Lopez, PLLC

(57) ABSTRACT

Methods and systems for feature extraction of LIDAR surface manifolds. LIDAR point data with respect to one or more LIDAR surface manifolds can be generated. An AHAH-based feature extraction operation can be automatically performed on the point data for compression and processing thereof. The results of the AHAH-based feature extraction operation can be output as a compressed binary label representative of the at least one surface manifold rather than the point data to afford a high-degree of compression for transmission or further processing thereof. Additionally, one or more voxels of a LIDAR point cloud composed of the point data can be scanned in order to recover the compressed binary label, which represents prototypical surface patches with respect to the LIDAR surface manifold(s).

12 Claims, 6 Drawing Sheets

(56) References Cited

U.S. PATENT DOCUMENTS

| | | |
|---|---|---|
| 7,039,619 B2 | 5/2006 | Nugent |
| 7,082,394 B2 | 7/2006 | Burges et al. |
| 7,107,252 B2 | 9/2006 | Nugent |
| 7,392,230 B2 | 6/2008 | Nugent |
| 7,398,259 B2 | 7/2008 | Nugent |
| 7,409,375 B2 | 8/2008 | Nugent |
| 7,412,428 B2 | 8/2008 | Nugent |
| 7,420,396 B2 | 9/2008 | Nugent |
| 7,426,501 B2 | 9/2008 | Nugent |
| 7,502,769 B2 | 3/2009 | Nugent |
| 7,599,895 B2 | 10/2009 | Nugent |
| 7,681,245 B2 | 3/2010 | Walker et al. |
| 7,752,151 B2 | 7/2010 | Nugent |
| 7,827,130 B2 | 11/2010 | Nugent |
| 7,827,131 B2 | 11/2010 | Nugent |
| 7,853,049 B2 | 12/2010 | Lee et al. |
| 7,930,257 B2 | 4/2011 | Nugent |
| 8,022,732 B2 | 9/2011 | Nugent |
| 8,041,653 B2 | 10/2011 | Nugent |
| 8,103,102 B2 | 1/2012 | Chien et al. |
| 8,972,316 B2* | 3/2015 | Nugent ............... H04L 63/1408 706/25 |
| 9,104,975 B2* | 8/2015 | Nugent ................. H03K 19/00 |
| 9,269,043 B2* | 2/2016 | Nugent ................. G06N 3/049 |
| 9,589,238 B2* | 3/2017 | Nugent ............... G06N 99/005 |
| 2005/0215239 A1 | 9/2005 | Kopra et al. |
| 2006/0036559 A1* | 2/2006 | Nugent .................. G06N 3/08 706/23 |
| 2006/0136411 A1 | 6/2006 | Meyerzon et al. |
| 2010/0174859 A1 | 7/2010 | Principe et al. |
| 2010/0198765 A1* | 8/2010 | Fiorillo ................. G06N 3/049 706/21 |
| 2010/0316287 A1 | 12/2010 | Duong et al. |
| 2011/0145179 A1 | 6/2011 | Nugent |
| 2012/0044476 A1 | 2/2012 | Earhart et al. |
| 2012/0092645 A1 | 4/2012 | Inokuchi |
| 2012/0124113 A1 | 5/2012 | Zalik et al. |
| 2013/0159229 A1 | 6/2013 | Modha |
| 2014/0019393 A1 | 1/2014 | Modha |
| 2016/0004959 A1* | 1/2016 | Nugent ................. G06N 3/063 706/26 |

OTHER PUBLICATIONS

Bag, S. et al. "Topographic Feature Extraction for Bengali and Hindi Character Images," Signal & Image Processing: An International Journal (SIPIJ) (2011) 2(2):181-196.

Imtiaz, H. et al., "A Face Recognition Scheme Using Wavelet-Based Dominant Features," Signal & Image Processing: An International Journal (SIPIJ) (2011) 2(3):69-80.

Pobitzer, A. et al., "Energy-scale Aware Feature Extraction for Flow Visualization," Eurographics/IEEE Symposium on Visualization (2011) 30(3):771-780.

Yufik, Y. M. et al., "Swiss Army Knife and Ockham's Razor: Modeling and Facilitating Operator's Comprehension in complex Dynamic Tasks," IEEE Transactions on Systems, Man, and Cybernetics—Part A: Systems and Humans (2002) 32(2):185-199.

Yufik, Y. M., "How the Mind Works: An Exercise in Pragmatism," Inst. of Med. Cybern. Inc. (2002) Gaithersburg, MD, 5 pages.

* cited by examiner

SYSTEM FOR AHAH-BASED FEATURE EXTRACTION OF SURFACE MANIFOLDS

CROSS-REFERENCE TO PATENT APPLICATION

This application is a continuation of U.S. patent application Ser. No. 15/057,184, which was filed on Mar. 1, 2016, the disclosure of which is incorporated herein by reference in its entirety. U.S. patent application Ser. No. 15/057,184 is continuation of U.S. patent application Ser. No. 13/613,700, which was filed on Sep. 13, 2012, and which claimed priority under 35 U.S.C. 119(e) to U.S. Provisional Patent Application Ser. No. 61/663,264, which was filed on Jun. 22, 2012, the disclosures of which are also incorporated herein by reference in their entireties. This patent application thus claims priority to the Jun. 22, 2012 filing date of U.S. Provisional Patent Application Ser. No. 61/663,264.

TECHNICAL FIELD

Embodiments are generally related to machine learning and artificial intelligence. Embodiments additionally relate to feature extraction methods and systems. Embodiments further relate to the field of LIDAR (Light Detection And Ranging, also LADAR).

BACKGROUND

Machine learning can roughly be characterized as the process of creating algorithms that can learn a behavior from examples. One simple example is that of pattern classification. A series of input patterns are given to the algorithm along with a desired output (the label) and the algorithm learns how to classify the patterns by producing the desired label for any given input pattern. Such a method is called supervised learning since the human operator must provide the labels during the teaching phase. An example is the kernal-based SVM algorithm. Alternately, unsupervised "clustering" is a process of assigning labels to the input patterns without the use of a human operator. Such unsupervised methods must usually function through a statistical analysis of the input data, for example, finding the Eigen value vectors of the covariance matrix. One such example of unsupervised clustering is the suit of k-means algorithms.

A few problems have continued to challenge the field of machine learning. Few if any standard and accepted methods exist for learning based on few patterns or exemplars. Without sufficient examples, finding a solution that balances memorization with generalization is often difficult. The difficulty is due to separation of a training and testing stage, where the variables that encode the algorithms learning behavior are modified during the learning stage and tested for accuracy and generalization during the testing phase. Without sufficient examples during the learning stage, it is difficult or impossible to determine the appropriate variable configurations leading to this optimal point. Theoretically, the mathematical technique of support-vector-maximization provides an optimal solution, should there be sufficient training data to encompass the natural statistics of the data and presuming the statistics do not change over time, a problem called concept drift. The idea is that all input patterns are projected into a high dimensional where they are linearly separable space.

A linear classifier can then be used to label the data in binary classification task. A linear classifier can be thought of as a hyper plane in a high-dimensional space, where we call the hyper plane the decision boundary. All input falling on one side of the decision boundary results in a positive output, while all inputs on the other side result in a negative output. The support-vectors are the distances from the closest input points to the decision boundary. The process of maximizing this distance is the process of support-vector-maximization. However, without sufficient examples it is of little or no use since identifying the support-vectors requires testing a number of input patterns to find which ones are closer to the decision boundary. Indeed, some thought may convince the reader that finding the point of optimal generalization is not possible with only one example since by definition measuring generalization requires evaluation of a number of exemplars.

Another problem facing the field of machine learning is adaptation to non-stationary statistics, i.e. concept drift. The problem occurs when the statistic of the underlying data changes over time. Any method that relies on a separation of training and testing is doomed to failure, as whatever the algorithm has learned quickly becomes incorrect as time moves forward. Methods for continual real-time adaptation are clearly needed, but such methods are often at odds with the training methods employed to find the initial solution.

Another problem facing the field of machine learning is power consumption. Finding statistical regularities in large quantities of streaming information can be incredibly power intensive, as the problem encounters combinatorial explosions. The complexity of the task is echoed in biological nervous systems, which are essentially communication networks that self-evolve to detect and act on regularities present in the input data stream. It is estimated that there are between 2 and 4 kilometers of wires in one cubic millimeter of cortex. At 2500 cm2 total area and 2 mm thick, that is 1.5 million kilometers of wire in the human cortex, or enough wire to wrap around the earth 37 times.

For this reason, the closer one can match the distributed processors of the hardware to the structure of the underlying network being simulated, the less information must be shuttled back-and-forth between memory and processor and the lower the power dissipation required for emulation. The limit of efficiency occurs when the hardware becomes the network, which occurs when memory becomes processing. We call this point physical computation, since the physical properties of the system are now "computing" the answer rather than the answer being arrived at abstractly through operations on numbers represented as binary values. Physical computation is related to, but not the same as, analog computation. For example, consider the problem of simulating the fall of a rock dropped from some height. We may go about a solution in a number of ways. First, we may derive a mathematical expression and evaluate this on a digital computer. This is digital computing. Second, we may solve a differential equation by noticing the equations of motions are mathematically equivalent to some other process, for example, those of transistor physics. This is analog computing. The third option is that we could find a rock and drop it. This is physical computing. Relatively simple arguments can be made to show that this is the only practical solution to large adaptive systems on the scale of living systems such as a brain. Digital and analog computing each suffer from the memory-processing duality, a condition which does not exist in nature and which introduces very high power dissipations for highly adaptive large-scale systems.

As an example of just how significant computation is, consider IBM's recent cat-scale cortical simulation of 1 billion neurons and 10 trillions synapses. This effort required 147,456 CPU's and ran at 1/100th real time. At a power consumption of 20 W per CPU, this is 3 megawatts. If we presume perfect scaling, a real-time simulation would consume 100× more power: 300 megawatts. A human brain is ~20 times larger than a cat, so that a real-time simulation of a network at the scale of a human would consume 6 GW if done with traditional serial processors. This is 600 million times more energy than a human brain actually dissipates. It is worth consideration that every brain in existence has evolved for just one purpose: to control an autonomous platform. An algorithm for finding regularities in large quantities of streaming information that cannot be mapped directly to physically adaptive hardware will likely not find use in mobile platforms, as the energy demands far exceed practical power budgets.

BRIEF SUMMARY

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is, therefore, one aspect of the disclosed embodiments to provide for an improved feature extraction method and system.

It is another aspect of the disclosed embodiments to provide for methods and systems for feature extraction of surface manifolds from noisy point cloud data sources.

The aforementioned aspects and other objectives and advantages can now be achieved as described herein. Methods and systems for feature extraction of surface manifolds are disclosed herein. In general, pixilated data with depth information can be generated via techniques including, for example, LIDAR. An AHAH-based feature extraction operation can be automatically performed on or with respect to the point data for compression and processing thereof. The results of the AHAH-based feature extraction operation can be output as a compressed binary label representative of the at least one surface manifold rather than the point data to afford a high-degree of compression for transmission or further processing thereof. Additionally, one or more voxels of a point cloud composed of the point data can be scanned in order to recover the compressed binary label, which represents prototypical surface patches with respect to the surface manifold(s).

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

Figure 1:
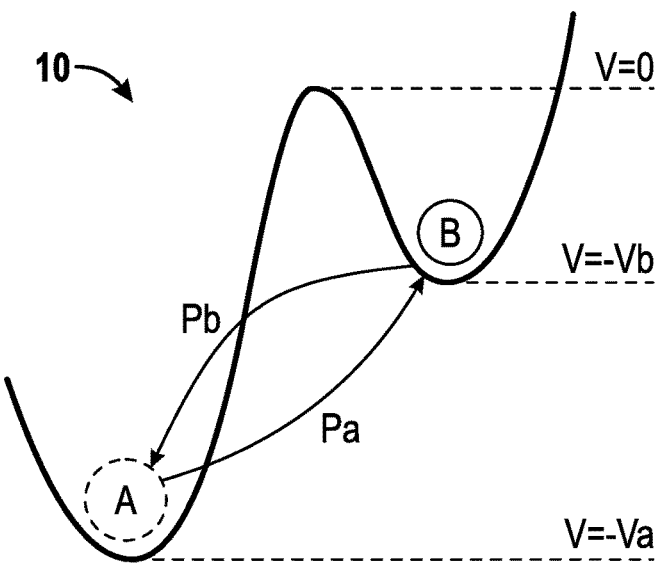
FIG. 1 illustrates a graph depicting data indicative of a meta-stable switch, in accordance with the disclosed embodiments.

The particular values and configurations discussed in these non-limiting examples can be varied and are cited merely to illustrate an embodiment of the present invention and are not intended to limit the scope of the invention.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The disclosed embodiments offer first a mechanism that can optimally produce a series of labels responding to features in an input data stream. Given a set of noisy, incomplete but re-occurring patterns, the goal is to output stable labels for the patterns. We can achieve this goal by using a collection of AHAH nodes to collapse the input space from a high-dimensional and noisy input space to a low-dimensional and noise-free space, where we can then perform exact bit matching on the output to further reduce the dimensionality. Because our methods can be constructed as a physical circuit, we will proceed with a background on memristors as meta-stable switches and the AHAH plasticity rule. However, the methods may also be utilized in more traditional methods of software and hardware where we extract core mathematical models and simulate these models within our computing system. The AHaH rule can be understood as a two-part procedure of state evaluation that results in negative feedback to the synaptic state (Anti-Hebbian Learning) followed by state reinforcement that results in positive feedback to the synaptic state (Hebbian learning). Such techniques are detailed in, for example, U.S. Pat. No. 7,599,895, which is incorporated herein by reference.

A memristor is a collection of meta-stable switches (MSS). Each MSS possesses at least two states, A and B, separated by a potential energy barrier. This can be seen in Illustration 1. We will set the barrier potential as the reference potential V=0. The probability that the MSS will transition from the A state to the B state is given by $P_A$, while the probability that the MSS will transition from the B state to the A state is given by $P_B$.

The transition probabilities $[P_A, P_B]$ can be modeled as:

$$P_A = \alpha \frac{1}{1 + e^{-\beta(\Delta V - V_A)}} = \alpha \Gamma(\Delta V, V_A)$$

$$P_B = \alpha(1 - \Gamma(\Delta V, V_B))$$

In this case, $$\beta = \frac{q}{kT}$$

is the thermal voltage and is equal to $$26 \text{ mV}^{-1}, \frac{\Delta t}{t_c}$$

is the ratio of the time step period $\Delta t$ to the characteristic time scale of the device $t_c$ and $\Delta V$ is the voltage across the device. We will define $P_A$ as the positive-going direction so that a positive applied voltage increases the chances of occupying the B state. Each state has an intrinsic electrical conductance given by $w_A$ and $w_B$. A MSS possesses utility in an electrical circuit as a memory or adaptive computational element so long as these conductances are different. We will take the convention that $w_b \geq w_a$.

FIG. 1 illustrates a graph 10 depicting data indicative of a meta-stable switch, in accordance with the disclosed embodiments. A meta-stable switch is a two-state device that switches probabilistically between its states as a function of applied bias and temperatures. A memristor is a collection of N meta-stable switches. We can model this in discrete time steps $\Delta t$. The memristor conductance is given by the sum over each meta-stable switch:

$$W_m = N_A w_A + N_B w_B = N_B(w_B - w_A) + N w_A$$

wherein $N_A$ is the number of MSS's in the A state, $N_B$ is the number of MSS's in the B state and $N = N_A + N_B$. At each time step some sub-population of the MSSs in the A state will transition to the B state, while some sub-population in the B state will transition to the A state. The probability that k switches will transition out of a population of n switches given a probability of p is given by the binomial distribution:

$$P(n, k) = \frac{n!}{k!(n-l)!} p^k (1-p)^{n-k}$$

As n becomes large, we may approximate the binomial distribution with a normal distribution:

$$G(\mu, \sigma^2) = \frac{1}{\sqrt{2\pi\sigma^2}} e^{\frac{-(x-\mu)^2}{2\sigma^2}}$$

wherein $\mu = np$ and $\sigma^2 = np(1-p)$.

The change in conductance of a memristor is a probabilistic process since a memristor is composed of discrete meta-stable switches. Using the approximation above, the number of MSSs that transition between A and B states is picked from a normal distribution with a center at np and variance np(1−p), where the state transition probabilities are given as above.

The update to the memristor conductance is thus given by the contribution from two random variables picked from two normal distributions:

$$\Delta N_B = G(N_A P_A, N_A P_A(1-P_A)) - G(N_B P_B, N_B P_B(1-P_B))$$

The update to the conductance of the memristor is then given by:

$$\Delta w_m = \Delta N_B(w_B - w_A)$$

To measure the characteristic timescale of the device one may initialize a memristor into a non-equilibrium state such as $N_B = N$ or $N_B = 0$ and measure the decay back to an equilibrium conductance period under zero bias.

Figure 2:
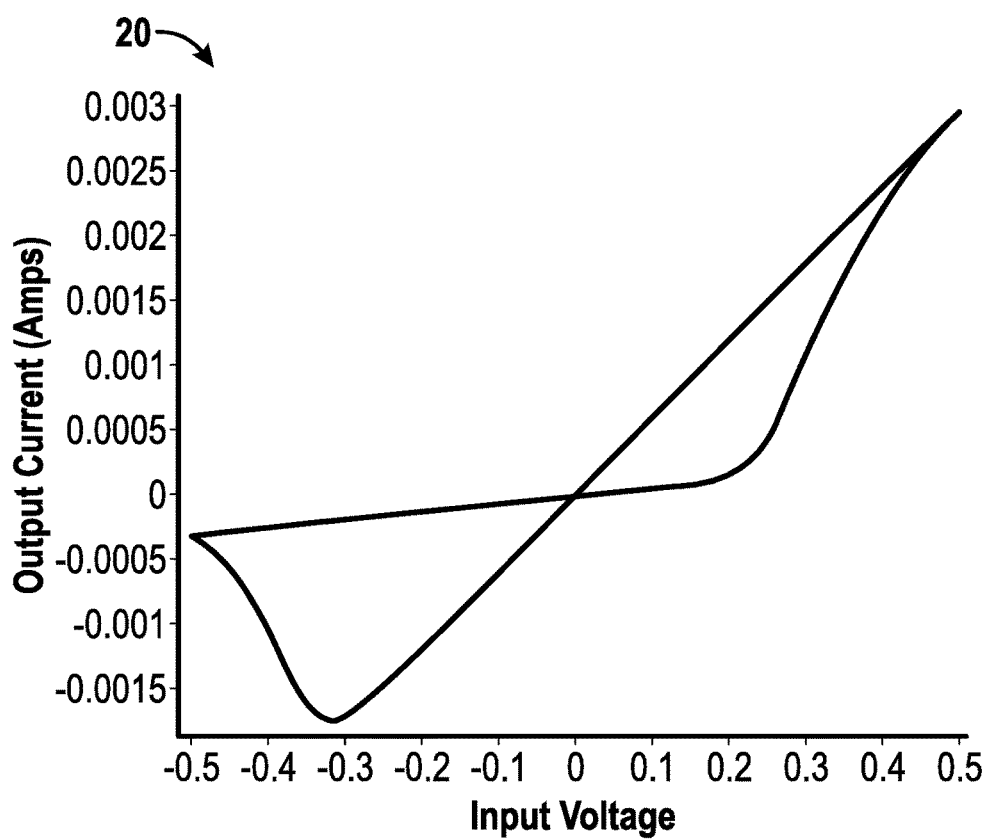
FIG. 2 illustrates a sample graph of a Lissajous I-V curve, in accordance with the disclosed embodiments.

FIG. 2 illustrates a sample graph 20 of a Lissajous I-V curve, in accordance with the disclosed embodiments. Graph 20 plots output current along the y-axis versus input voltage along the x-axis for a sample memristor in graph 20. A memristor is intrinsically a stochastic element, although if composed of many MSS's or subjected to large voltage differentials it may appear to be deterministic. Depending on the relative values of $V_A$ and $V_B$ the device will display a range of characteristics. Of some interest is the property of decay and a non-conducting ground state, which we can be achieved under the conditions $V_B < V_A$, $V_A \Rightarrow kTlq$ and $w_B > w_A$.

The utility of a memristor lies in its ability to change its conductance as a function of the voltage history applied to the device. This can be illustrated by a Lissajous I-V curve that shows how the conductance of a memristor changes over time as a sinusoidal voltage is applied.

The core device element of our self-organizing unit or node is thus the meta-stable switch, and a memristor can be seen as a device composed of a collection of meta-stable switches. A synapse is a differential pair of memristors: $W = w_0 - w_1$, where W denotes the difference in conductance between the two memristors composing the synapse.

Figure 3:
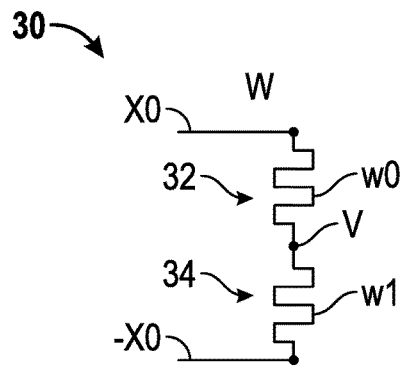
FIG. 3 illustrates a schematic diagram of a synapse based on a differential pair of memristors, in accordance with the disclosed embodiments.

FIG. 3 illustrates a schematic diagram of a synapse 30 based on a differential pair of memristors 32, 34, in accordance with the disclosed embodiments. The configuration shown in FIG. 3 is not unique and in fact there exists three possible configurations: 2-1, 1-2, and 2-2, which refers to the number of input and output electrodes on the synapse. A further discussion of possible arrangements can be found in U.S. Pat. No. 7,599,895 entitled "Methodology for the Configuration and Repair of Unreliable Switching Elements," which issued on Oct. 6, 2009, and is incorporated herein by reference in its entirety.

The probability that a meta-stable switch will transition from its ground state to excited state is a function of the applied voltage and time it is applied. For this treatment, we will take the function to be quadratic in voltage and linear in time as indicated by the following equation:

$$P(E_0 \to E_1) \approx \alpha V^2 T$$

In the above equation, the variable $\alpha$ represents a constant and the variable T represents a characteristic update timescale. We are thus presuming that both applied voltage polarities will cause the memristor to increase its conductance. This is the case in memristors composed of nanoparticles in a colloidal suspension, but is not true of all memristors, for example, those reported by Hewlett-Packard, University of Boise, University of Michigan, UCLA, and others. In these cases, a reverse voltage polarity will cause a decrease in device conductance. This is shown above in FIG. 2.

Furthermore, a memristor may act as an intrinsic diode. This is true of some memristors, for example, that reported of U of M, but not of others (U of B). We may thus categorize the various types of memristors as polar or non-polar in regards to their ability to change conductance as a function of the applied voltage and rectifying or non-rectifying as a function of their intrinsic (or not) diode properties. Our methods apply to all such configurations, although various synaptic configurations (1-2, 2-1, 2-2) must be used. Furthermore, a mechanisms for lowering the conductance of the device must be available, be it a reverse bias, application of high frequency AC voltage, or simply to let it decay over time.

Figure 4:
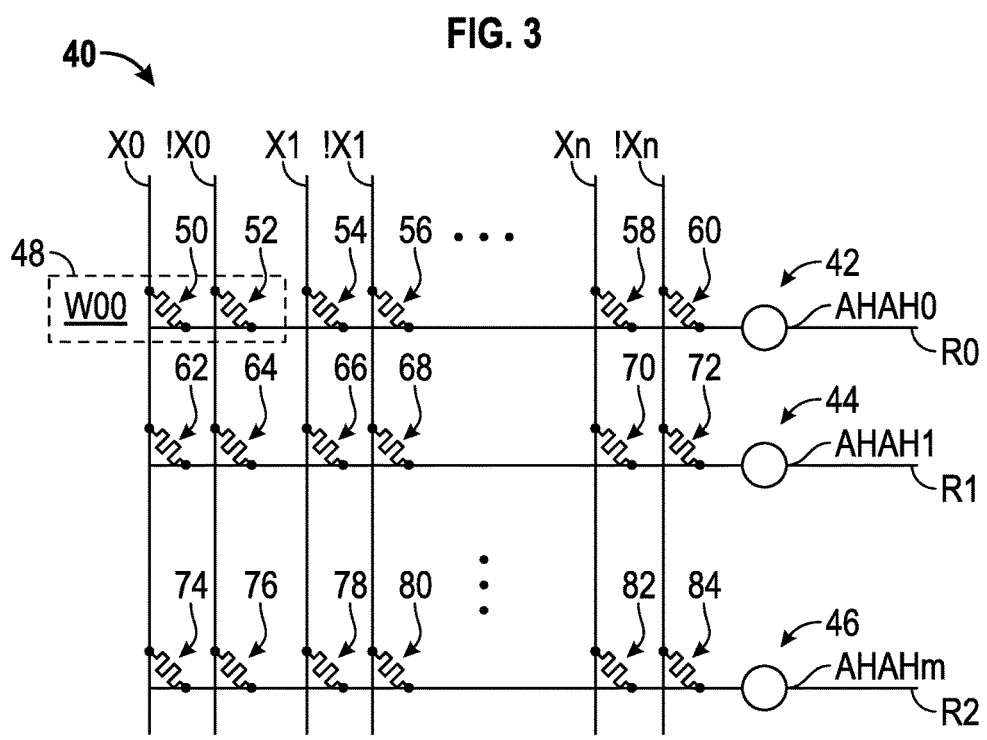
FIG. 4 illustrates a schematic diagram depicting a circuit that includes plurality of AHAH nodes, in accordance with the disclosed embodiments.

FIG. 4 illustrates a schematic diagram depicting a circuit 40 that includes a plurality of AHAH nodes 42, 44, and 46, in accordance with the disclosed embodiments. Circuit 40 further includes memristors 50 to 84. An AHAH node is a collection of synapses and associated CMOS feedback circuitry acting on one of the three possible electrode configurations of 1-2, 2-1 or 2-2. We will illustrate the 2-1 case below for non-rectifying polar memristor. Synapses are formed at the intersection of output and input electrodes. A synapse is a differential pair of memristors between the two output electrodes and one input electrode, as shown in illustration 3. A node is formed from many such synapses connecting many inputs to the node's electrode, as seen in FIG. 4. Many such circuits are possible for providing feedback voltage to the node's electrode. Before we discuss one possible circuit, let us turn our attention to one node and recognize it as a series of voltage-divider circuits formed from the input lines.

Figure 5:
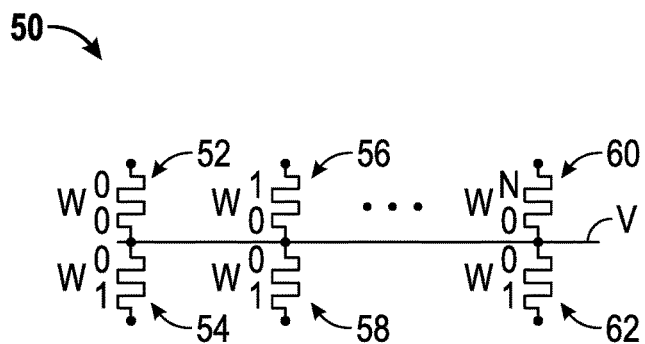
FIG. 5 illustrates a schematic diagram of a group of differential synapses.

FIG. 5 illustrates a schematic diagram of a group of synapses, wherein each synapse can be seen as a voltage divider prior to application of feedback voltage, in accordance with the disclosed embodiments. The sample synapses shown in FIG. 5 include memristors 52, 54, and 56, 58, and 60, 62. In general, the AHAH rule is composed of two basic phases: Evaluate and Feedback. During the evaluate phase, input voltages are applied and these voltage are integrated via the differential synapses on the nodes electrode. The evaluation phase is a passive process and, in the case of the 2-1 configuration, consists of solving for the steady-state voltage. It should be noted that during this phase, each synaptic state undergoes negative feedback.

For example, suppose a memristor was highly positive so that: $w_0 \gg w_1$. This will have the effect of pulling the electrode voltage (V in illustration 3 and 5) up, reducing the voltage drop across the $w_0$ memristor but increasing it over the $w_1$ memristor. This will cause the $w_1$ to increase its conductance more than the $w_0$ memristor, thus moving the synapse back toward the zero-point. During the feedback phase, positive feedback is applied to the electrode via a voltage-keeper circuit. During the feedback phase, the synapse undergoes an update that is opposite in direction to that which it received during the evaluation phase and it proceeds for a variable time. This can be seen more clearly in FIG. 6, where we have identified four basic phases, θ0 through θ3, labeled charge, evaluate, feedback, and decay, respectively.

Figure 6:
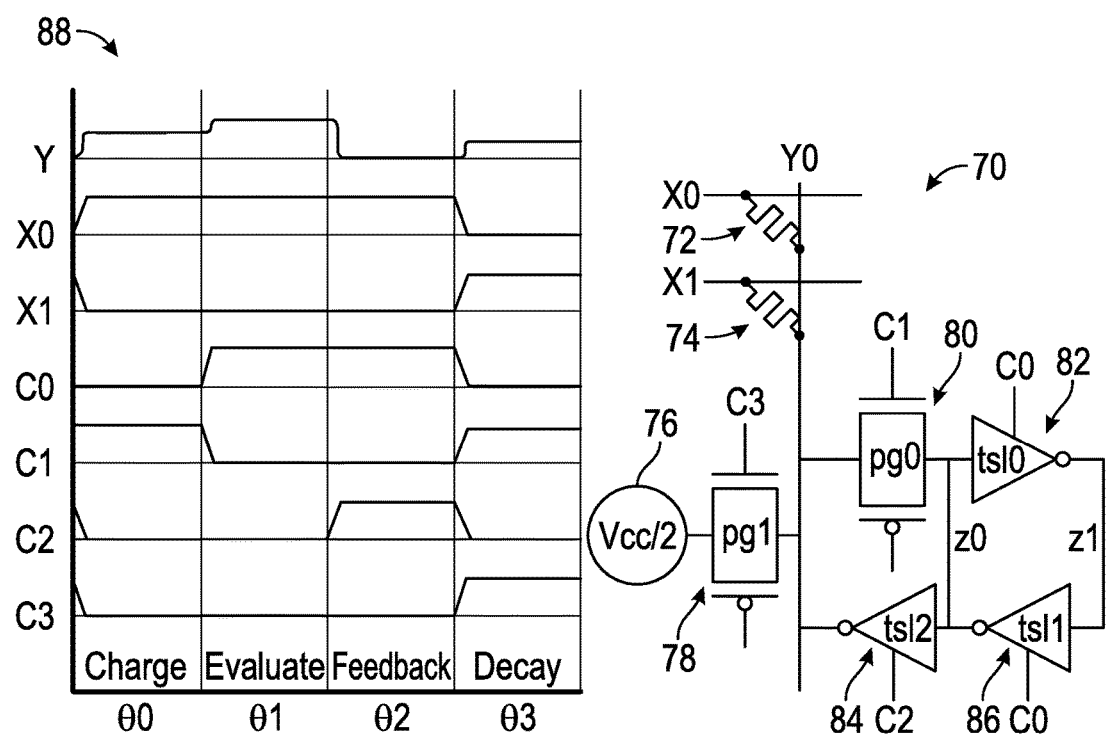
FIG. 6 illustrates a schematic diagram of a 2-1 post-flip AHAH circuit, in accordance with the disclosed embodiments.

FIG. 6 illustrates a schematic diagram of a 2-1 post-flip AHAH circuit 70, in accordance with the disclosed embodiments. Circuit 70 generally includes memristors 72, 74 and a voltage source 76 ($V_{cc}/2$), along with components 78, 80 and inverters 82, 84, and 86. A graph 88 also shown in FIG. 6, tracks charge, evaluate, feedback, and decay phases. In the most general case, we may omit the evaluate and decay phase, although we include them here for clarity. In the charge phase, voltages are applied to the inputs and the post-synaptic voltage is evaluated via a passive integration. In the evaluate phase, the positive-feedback voltage keeper circuit controlled with clock C0 is activated. During feedback, the post-synaptic voltage is inverted through deactivation of passgate with clock C1 and activation of inverter C2.

During the decay phase, the inputs are inverted and the post-synaptic electrode voltage is set to ½ of the supply voltage such that each memristor receives equal and opposite voltage and thus achieves an "accelerated decay". This phase may be removed from each dock cycle, for example, occurring once every 100-clock cycles, or should the memristor have a natural decay rate commiserate with the usage, a period of sleep would suffice. One can see how many strategies are available to accomplish the basic anti-hebbian and hebbian phases of the AHaH rule.

The operation of the device can be seen as a "memory read" and "memory refresh cycle", where the act of read (evaluate) damages the synaptic states, while feedback repairs the state. It is obvious that each memristors conductance would saturate over time if not reduced. This can be accomplished by adding a decay phase in the cycle as shown, by providing for a sufficiently long rest-state to allow the memristors to decay, or to force the decay by applying an equal-magnitude reverse bias across both memristors after a set or variable number of cycles. Although there are multiple ways to accomplish the task, the net effect is simply to decay the memristors to keep them operating within their dynamic range and to prevent saturation over time. We call such an operation a synaptic normalization. As the dynamic range of the memristors increases, the frequency of synaptic renormalization may be reduced.

A fundamentally important property to the AHAH rule is that as the magnitude of the post-synaptic activation becomes large, the Hebbian portion of the update must decrease in magnitude or transition to Anti-Hebbian. This property insures the rule converges to independent components of the data that is being processed by the AHaH node.

Let us now take a step back and discuss data structure before again focusing on specific circuit implementations.

Suppose that we took a monochromatic digital picture of page of text. By arranging the pixels in proper rows and columns, you would of course be able to perceive the text and understand what is written. However, the underlying data structure is not letters, its binary pixels. By simply taking the array of pixels and arranging them into any other pattern, what was coherent is now an incoherent jumble of bits. The conclusion is that the structure of the information (the letters) is not the same as the information channels that carry the information (the pixels). The primary function of unsupervised clustering algorithms is to uncover the structure of the information.

Two wires carrying the same sequence of bits do not carry any additional information. This is captured in the concept of mutual information, which measures how much one signal tells us about another signal. If the mutual information between wire A and wire B was 1, for example, they carry the same information. If the mutual information is zero, then they are independent. Let us visualize this with respect to FIG. 7, which illustrates a data structure 90 of four different distributions on two wires X0 and X1, in accordance with the disclosed embodiments. These four different distributions are: (I) The mutual information between X0 and X1 is 1 and no states can be distinguished; (II) Two states can be resolved; (III) Three states can be resolved; and (IV) Nine states can be resolved.

Figure 7:
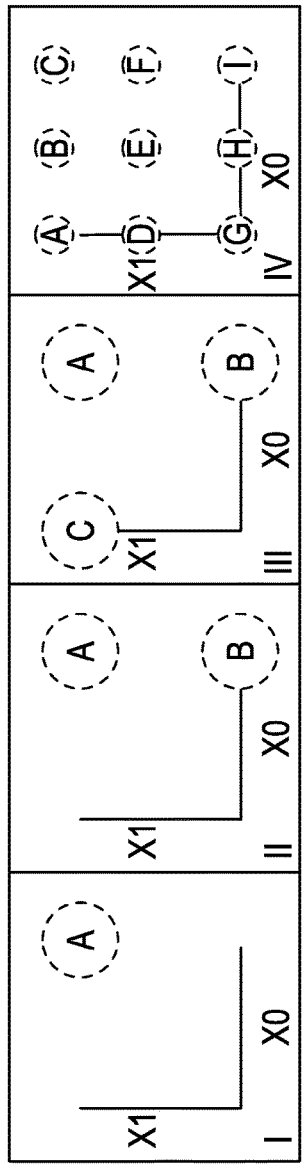
FIG. 7 illustrates a data structure of four different distributions on two wires x0 and x1, in accordance with the disclosed embodiments.

We must make two important points about FIG. 7. First, the number of states carried by the wires is in general unrelated to the number of wires that carry the information. For binary encodings, the total number of resolvable states over N wires is as high as $2^N$ but likely much lower. The first challenge in unsupervised clustering or learning algorithms is to resolve underlying states from observations over time. Second, wires that do not resolve more than one state are useless. Think about it this way: suppose you were locked in a room and could only observe two light blubs. If the light blubs were always on, as in (I) of Illustration 7, they can convey no information. On the other hand, if one of the light blubs blinked on and off while the other remained on as in (II), you could distinguish between two states. Something must be causing that light to turn on and off. There must be a source. What is the nature of this source? An answer to this question gets at the heart of machine learning. Suppose that our observations of two wires X0 and X1 led to the distribution of II. Furthermore, once we recognized the existence of two states we took note of their specific sequence over time: ABAABBABAABB . . . .

We can now identify further temporal structure. It is temporal structure that allows us to infer the existence of a source or mechanism in the environment, since temporal events link cause and effect. Explaining a temporal sequence requires a model of a mechanism that generates the sequence. We could analyze the sequence in a number of ways. For example, the sequence AA follows AB, BB follows AA, and AA follows AB, repeating in a cycle. On the other hand, the sequence ABAABB is simply repeating, or ABB follows ABA. How we view the sequence is dependent on the temporal window we are capable of holding in memory. This leads us to an important simplifying observation. The sequence above is not actually a sequence! It is spatial pattern. After all, what we have communicated is static letters on a page, not a temporally dynamic video or song. By recording in temporary memory prior states, we have converted a temporal pattern into a spatial pattern. The problem of identifying temporal structure then becomes the problem of identifying spatial structure.

It is this realization that has spawned the recent work in liquid and echo state machines, which have been used successfully in predicting/modeling time sequences and learning temporal transfer functions. A rock thrown into a still pond will create ripples such that taking a picture at any instant in time enables the past to be reconstructed. Temporal structure is converted into spatial structure when information travels through networks of path-delays.

Suppose we created a large dynamic network as in biological cortex, where pulses traveled between nodes over links. The fact that a signal takes time to propagate over a link introduces a time-delay in the network and at this moment temporal structure is converted into spatial structure.

For example, two pulses that arrive at the same time at a node could have taken two paths: one path could come directly from a sensory input while the other could have come from another sensory input multiple times steps in the past. What the node perceives as a spatial coincidence is actually a prediction, and the prediction has been encoded as links in the network.

Recall from the discussion of FIG. 7 that only states which can be distinguished are useful. A light that is always on or always off can communicate no information and can serve no useful function to a network. Extraction of data structure would then appear to be related to a fundamental operation of differentiation between states over time. Given some time series of vectors P=[$p_0$, $p_1$, $p_2$, . . . $p_n$], what spatial states can be distinguished? What are the spatial building blocks? Technically, we are looking for the extraction of signals that are independent in time.

If an input pattern falls on one side of the decision boundary, the output of the AHAH node is positive, while it is negative if it is on the other side of the boundary. Stated another way, the node output is an efficient binary encoding representing one natural independent component of the input data distribution. It is clear that a single AHAH node cannot alone become selective to a particular feature or pattern in the data. For example, consider the distribution of IV in FIG. 8. There are nine input data states or patterns. An AHAH node may only bifurcate its space as it can only output a binary label. However, a collective of AHAH nodes each occupying different states can, as a group, distinguish each feature.

Figure 8:
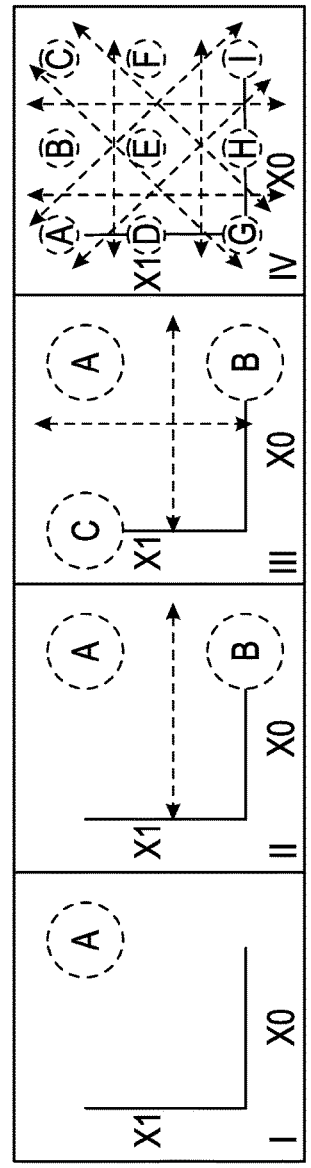
FIG. 8 illustrates a schematic diagram of AHAH rule attractor points representing bifurcations of its input space, in accordance with the disclosed embodiments.
Figure 9:
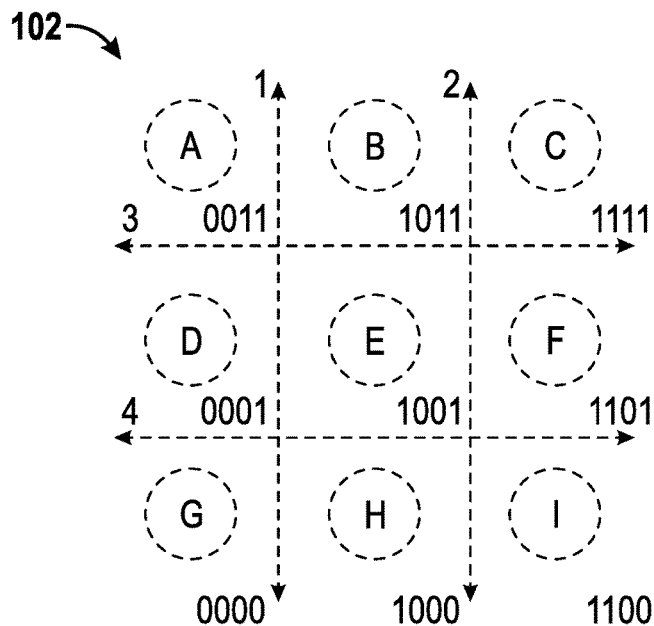
FIG. 9 illustrates a collective of AHAH nodes each occupying distinct attractor states can distinguish features, in accordance with the disclosed embodiments.

Suppose we had two input wires that carried a sequence of vectors that, over time, matched the distribution of IV in FIG. 8. These two inputs connect to four AHAH nodes, 1-4. One such configuration is seen in FIG. 9. FIG. 9 illustrates a collective 102 of AHAH nodes each occupying distinct attractor states that can distinguish features. Lines 1-4 in FIG. 9 represent the decision boundaries of AHAH node 1-4. Features A-I fall in FIG. 9 on various sides of each node decision boundary so that each feature results in a unique binary output from the group of AHAH nodes Given some input pattern, we can simply read off the output value of each node as a binary label that encodes each unique feature. Feature A gets the binary label 0011 because node 1 output is negative, 2 is negative, 3 is positive, and 4 is positive.

In such a way, a collective of AHAH nodes serves as a "partitioning" or "clustering" algorithm, outputting a unique binary label for each unique statistically independent input source, regardless of the number of input lines that carry the data.

The core operation of a collective of AHAH nodes can be seen in Illustration 10. Many sparse binary (spiking) inputs synapse onto a small collection of AHAH nodes. Each temporally correlated group of inputs forms independent components (IC) and the AHAH rule binds these inputs together by assigning them synapses of the same sign. In Illustration 10 we can see six IC's with positive weights shown as green and negative as red. The space of allowable AHAH states is $2^F$, wherein F is the number of input features (i.e. patterns). However, we do not wish each AHAH node to occupy every state. There is a possibility of all weights attaining the same sign, a condition we call the null state. The null state is useless computationally as the node's output never changes. To prevent occupation of the null state, we include a bias input that is always active and only ever receives anti-Hebbian updates.

To emphasize the general quality of the AHAH rule and its applicability outside of purely physically adaptive circuits, we will re-state the rule in a more generic mathematical form:

$$\Box w_i = x_i f(y)$$

$$y = \sum_{i=-}^{N} x_i w_i + x_{bias} w_{bias}$$

$$f(y) = \Box y + / / \cdot \text{sign}(y)$$

$$\Box w_{bias} = \Box y$$

In the above formulation/equations, α, β, and γ are constants, $x_i$ is the ith input and $w_i$ is the ith weight. We may generally presume that the inputs are binary and sparse so that only small subset, perhaps 10% or less, of inputs are active. Seen in this light, we may simply set x=1 for all active inputs and state that weights are modified when they are used and not otherwise. The bias can be seen as an input that is always active, and the update to the bias weight can be seen as purely anti-Hebbian. The constants control the relative contribution of positive and negative feedback and may be modified to achieve certain desired results. For example, by increasing the contribution of the bias input, we may increase a "restoring force" that forces the AHAH node into a state that bifurcates its input space. The net effect is a subtraction of an adaptive average. If the node has found an attractor state that splits its space in half, such that approximately half of the IC's are given positive weights and half are given negative weights, the average node output will be zero and the bias weight will be zero. If the output becomes unbalanced, the bias will bring it back, thus preventing the occupation of the null state.

Figure 10:
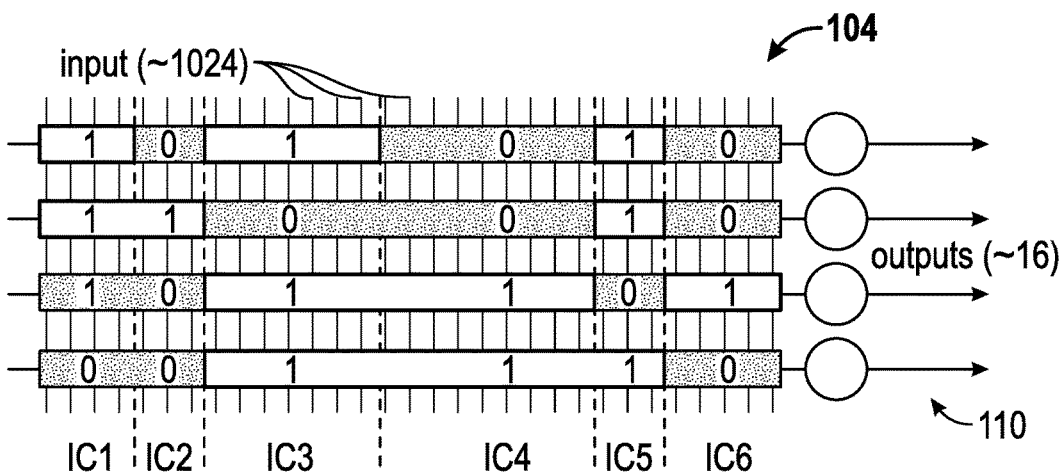
FIG. 10 illustrates a schematic diagram of a system of AHAH nodes, in accordance with the disclose embodiments.

FIG. 10 illustrates a schematic diagram of a system 104 of AHAH nodes. As shown in FIG. 10, the core operation of the collection or system 104 of AHAH nodes is spatial pooling of input lines into temporally independent components (IC), collapsing the large input space, and outputting stable binary labels for input features.

Once each AHAH node has settled into unique attractor states, the collective will output a binary label for each input feature, converting large, sparse, incomplete, noisy patterns into small, complete, noise-free binary patterns. There are various ways of describing this operation in the literature. We are performing a spatial pooling in that we are collapsing a large set of input patterns into a much smaller set, also known as clustering. We emphasize, however, that we are certainly not clustering in the traditional sense.

Methods like k-means perform projection operations, taking an input vector and projecting it onto the weight vectors of each node. The node with the best match is considered the "winner" and its weight vector is moved closer to the data pattern. The projection operation is critically dependent on the number of nodes used, which we believe to be an incorrect starting assumption. This is like presuming an absolute reference frame on the incoming data statistics. Given 10 nodes, the data will be projected onto a 10-dimensional coordinate axis, regardless of the natural statistics of the data. Our microcircuit is like a relative reference frame, where a feature is only distinguishable because it is not another feature. If the underlying dimensionality of the feature space is 10, for example, our circuit will output 10 labels independent of the number of AHAH nodes.

We are generating labels (L) for features (F). Let us presume that each AHAH node will randomly assign each IC to either the positive or negative state. The total number output labels is $2^N$, where N is the number of AHAH nodes. If N is small and the number of features high, it is possible that the AHAH node collective will output the same label for different features. However, as the number of nodes increases, the probability of this occurring drops exponentially. Specifically, the probability P that any two features will be assigned the same binary label goes, as:

$$P = \frac{1}{2^N} + \frac{2}{2^N} + \ldots + \frac{F}{2^N} = \frac{\sum_0^F i}{2^N} = \frac{F^2 + F}{2^{N+1}}$$

For 64 features and 16 nodes, the probability of two nodes being assigned the same label is 3%. By increasing N to 20 we can reduce this to only 0.4% and with 32 nodes it is less than one in a million.

Let us suppose for our purposes that we have 16 nodes so that the output of the collective is a stable 16-bit pattern. Each of the 16 bit patterns represents a feature. Although the space of possible patterns is $2^{16}$, only a small subset will ever occur if the data is structured. However, far from noisy and incomplete, the bit patterns are stable and can therefore be matched exactly. A further reduction from 16 bits to, for example, 8 bits can be accomplished through the use of content-addressable memory (CAM) or a least-recently-used-cache (LRUC) or other common methods. For example, given a set of 256 patterns we store patterns as rows and match new patterns bit-for-bit against new patterns.

Let us now return to FIG. 4, which depicts an array of M AHAH nodes (AHAH$_1$, AHAH$_2$, . . . , AHAH$_N$) receiving inputs from an array of inputs (X$_1$, X$_2$, . . . , X$_N$) and producing an output on a register R with values (R$_1$, R$_2$, . . . , R$_N$). The output of this register is a binary bit pattern of length M, which we may feed into a CAM to further reduce its dimension. This can be seen in FIG. 11, which shows the AHAH module providing an output that is input to the CAM module.

Content-Addressable Memory (CAM) is well known in the art, and many such embodiments are possible. Indeed, many variations may be used in the circuit described in FIG. 11.

Figure 11:
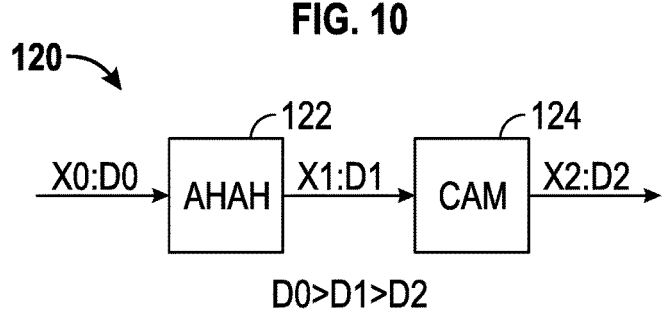
FIG. 11 illustrates a block diagram of a basic module layout, where the noisy input X0 in dimension D0 is reduced in dimensionality and conditioned to a stable bit pattern X1 in dimension D1, which is further reduced to a maximally efficient compact bit pattern X2 in dimension D2, in accordance with the disclosed embodiments.

FIG. 11 illustrates a block diagram of a basic module layout 120, where the noisy input X0 in dimension D0 is reduced in dimensionality and conditioned to a stable bit pattern X1 in dimension D1, which is further reduced to a maximally efficient compact digital encoding in dimension D2, in accordance with the disclosed embodiments.

The basic operation of our circuit is thus as follows: A large and likely sparse input is presented to a synaptic matrix of AHAH nodes, termed the AHAH module, which operates the AHAH plasticity rule via the evaluate-feedback cycle as discussed. A bias input line is modulated such that the bias weights do not receive the Hebbian portion of the weight update during the feedback cycle, which prevents occupation of the null state. The collection of AHAH nodes or AHAH module 122 fall randomly into their attractor states, which act to bifurcate their input space. The output of the AHAH module 122 forms a stable bit pattern, which is then provided as an input to a Content-Addressable Memory or CAM 124 for further reduction of dimensionality. The output of the CAM 124 thus provides maximally efficient binary labels for the regularities present in the input to the AHAH module 122.

The methods developed above are ideally suited for applications where large quantities of sparse data must be encoded into discrete packets or labels and transmitted over a wire. One such application is the identification of LIDAR surface manifolds from point cloud data. Rather than transmitting, for example, 1000 points of data we may only transmit the binary label for the particular surface patch that these points are revealing.

LIDAR (Light Detection And Ranging, also LADAR) is an optical remote sensing technology that can measure the distance to, or other properties of a target by illuminating the target with light, often using pulses from a laser. LIDAR technology has application in geomatics, archaeology, geography, geology, geomorphology, seismology, forestry, remote sensing and atmospheric physics as well as in airborne laser swath mapping (ALSM), laser altimetry and LIDAR contour mapping.

The acronym LADAR (Laser Detection and Ranging) is often used in military contexts. The term "laser radar" is sometimes used, even though LIDAR does not employ microwaves or radio waves and therefore is not radar in the strict sense of the word.

LIDAR uses ultraviolet, visible, or infrared light to image objects and can be used with a wide range of targets, including non-metallic objects, rocks, rain, chemical compounds, aerosols, clouds, and even single molecules. A narrow laser beam can be used to map physical features with very high resolution.

LIDAR has been used extensively for atmospheric research and meteorology. Downward-looking LIDAR instruments fitted to aircraft and satellites are used for surveying and mapping, a recent example being the NASA Experimental Advanced Research LIDAR. In addition, LIDAR has been identified by NASA as a key technology for enabling autonomous precision safe landing of future robotic and crewed lunar landing vehicles.

Wavelengths in a range from about 10 micrometers to the UV (ca. 250 nm) are used to suit the target. Typically light is reflected via backscattering. Different types of scattering are used for different LIDAR applications; most common are Rayleigh scattering, Mie scattering, and Raman scattering, as well as fluorescence. Based on different kinds of backscattering, the LIDAR can be accordingly called Rayleigh LIDAR, Mie LIDAR, Raman LIDAR, Na/Fe/K Fluorescence LIDAR, and so on.

Suitable combinations of wavelengths can allow for remote mapping of atmospheric contents by looking for wavelength-dependent changes in the intensity of the returned signal.

Figure 12:
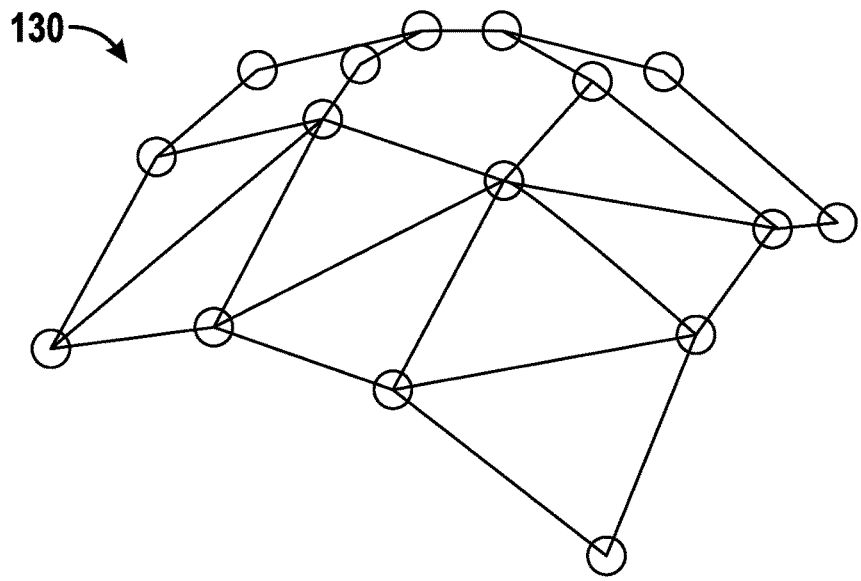
FIG. 12 illustrates a graphical representation of a collection of points from a measurement representing a surface patch.

FIG. 12 illustrates a graphical representation of a collection of points from a LIDAR measurement(s) representing a surface patch 130, in accordance with the disclosed embodiments. As may now be appreciated, LIDAR is a well-developed technology that is used to image an area by sending out pulses of light and detecting the backscattered radiation. This technology produces what has become known as a "point cloud" data representation that consists of a collection of many points, where each point has an "XYZ" coordinate and perhaps more attributes such as color. If one breaks the LIDAR data into smaller "3D pixels" or voxels of a certain size, one is left with a volume of space and a collection of LIDAR points that encode one or more surfaces. As the size of the voxel is reduced, the number of LIDAR points captured in the space will of course reduce. Although LIDAR produces a point representation, what is actually being sense is a surface in many cases. It is therefore advantageous to have efficient mechanisms for converting the point representation in a more compact "surface patch" representation for transmission and further processing.

The methods we have illustrated for spontaneous extraction of features via a collation of AHAH nodes may be employed for extraction and encoding of surface patches from LIDAR point data. The LIDAR point data may be broken down into two parts. First we may decompose the three-dimension space into voxels. Each voxel is composed of a number of element volume elements that may contain one or more LIDAR points. We are showing the 2D representation for convenience. It can be easily seen how the LIDAR point data may be represented as a voxel with active and inactive grid elements, where a voxel grid element is considered active if it contains within its spatial boundary one or more LIDAR points. The output of the voxel is thus a sparse binary activation vector consisting of the grid elements that are active.

Figure 13:
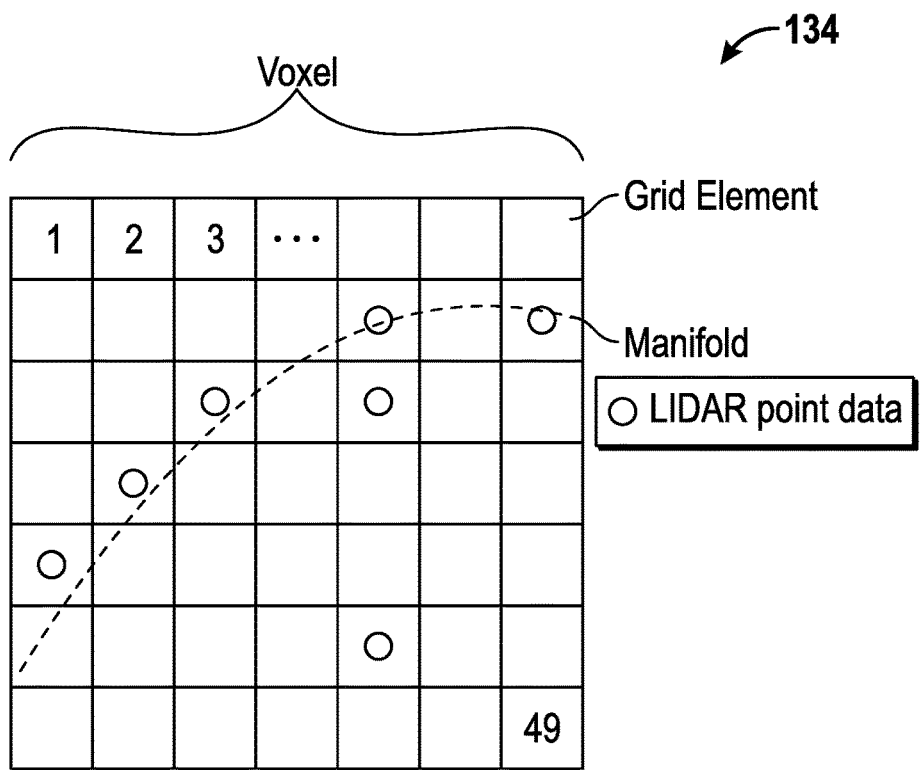
FIG. 13 illustrates a graph indicating that LIDAR point data may be encapsulated within voxels, which can be further discretized into grid elements and used to construct an activity vector consisting of the indices to the grid elements that contain point data, in accordance with the disclosed embodiments.

FIG. 13 illustrates a graph 134 indicating that LIDAR point data may be encapsulated within voxels, which can be further discretized into grid elements and used to construct an activity vector consisting of the indices to the grid elements that contain LIDAR point data, in accordance with the disclosed embodiments. In the example shown in FIG. 13, grid elements [12, 14, 17, 19, 23, 29, 40] are active. We may thus activate the corresponding input lines of an AHAH feature extraction system as in the configuration shown in FIG. 11. By scanning the voxel over the LIDAR point cloud, we may recover binary labels that represent prototypical surface patches. The output is thus a compressed binary label representative of a surface manifold rather than the point data, thus affording a high degree of compression for transmission or further processing.

It can be appreciated that the exact features, which are produced through this technique, are dependant on the statistics of the LIDAR data, which in turn are a direct reflection of the statistics of the environment it is measuring. Thus, the method has the potential to provide a high degree of compression due to the fact that the based features extracted represent the characteristic features of the environment. For example, the commonly occurring surface features within a city are largely flat and orthogonal to the ground whereas features within a more nature environment like a forest may occur at many orientations.

Based on the foregoing, it can be appreciated that a number of embodiments, preferred and alternative, are disclosed herein. For example, in one embodiment, a method for feature extraction of surface manifolds can be implemented. Such a method can include the steps or logical operations of, for example, generating point data with respect to at least one surface manifold, and performing an AHAH-based feature extraction operation on the point data for compression and processing thereof.

In another embodiment, a step or logical operation can be implemented for scanning at least one voxel of a point cloud composed of the point data in order to recover the compressed binary label which represents prototypical surface patches with respect to the at least one surface manifold. In still another embodiment, the aforementioned point data can include LIDAR point data and the surface manifolds comprise LIDAR surface manifolds. In still another embodiment, the LIDAR point data is capable of being represented as a voxel with at least one active grid element and at least one inactive grid element, wherein a voxel grid element is considered active if the voxel grid element contains within a spatial boundary thereof at least one LIDAR point. In another embodiment, the output of the voxel can comprise a sparse binary activation vector including grid elements that are active.

In another embodiment, a method for feature extraction can be implemented. Such an method can include, for example, the steps or logical operations of presenting an input to an AHAH module comprising a plurality of AHAH nodes, wherein the plurality of AHAH nodes operates according to an AHAH plasticity rule; and providing an output of the AHAH module as an input of a content-addressable memory for further reduction of dimensionability, wherein an output of the content-addressable memory provides maximally efficient binary labels for features present in the input to the AHAH module. In another embodiment, the plurality of AHAH nodes can fall randomly into attractor states which act to bifurcate input space. In yet another embodiment, steps or logical operations can be implemented for providing a link structure so as to convert temporally phase-shifted activations patterns into temporally correlated activations and extracting binary labels of features of the temporally correlated activations for compression or processing thereof.

In another embodiment a system for feature extraction of surface manifolds can be implemented. Such a system may include, for example, a processor; a data bus coupled to the processor; and a computer-usable medium embodying computer program code, the computer-usable medium being coupled to the data bus. The computer program code can include instructions executable by the processor and configured for: generating point data with respect to at least one surface manifold; and performing an AHAH-based feature extraction operation on the point data for compression and processing thereof. In another embodiment, such instructions can be further configured for scanning at least one voxel of a point cloud composed of the point data in order to recover the compressed binary label which represents prototypical surface patches with respect to the at least one surface manifold. In another embodiment, the point data can constitute LIDAR point data and the surface manifolds can constitute LIDAR surface manifolds. In other embodiments, the LIDAR point data is capable of being represented as a voxel with at least one active grid element and at least one inactive grid element, wherein a voxel grid element is considered active if the voxel grid element contains within a spatial boundary thereof at least one LIDAR point. In another embodiment, the output of the voxel can comprise a sparse binary activation vector including grid elements that are active.

In still another embodiment, a system for feature extraction can be implemented. Such a system can include, for example, an AHAH module comprising a plurality of AHAH nodes, wherein the plurality of AHAH nodes operates according to an AHAH plasticity rule and wherein an input is presented to the AHAH module, and a content-addressable memory, wherein the output of the AHAH can be provided as an input of the content-addressable memory for further reduction of dimensionability, wherein an output of the content-addressable memory provides maximally efficient binary labels for features present in the input to the AHAH module.

In another embodiment, the plurality of AHAH nodes can fall randomly into attractor states which act to bifurcate their input space. In another embodiment, a link structure can convert temporally phase-shifted activations patterns into temporally correlated activations. In another embodiment, an extractor can be provided for extracting binary labels of features of the temporally correlated activations for compression or processing thereof.

In another embodiment, a link structure can be provided, which converts temporally phase-shifted activations patterns into temporally correlated activations, wherein binary labels of features of the temporally correlated activations are extractable for compression or processing thereof.

In still another embodiment, a system for feature extraction of surface manifolds can be implemented. Such a system can include a means for generating point data with respect to at least one surface manifold and a means for performing an AHAH-based feature extraction operation on said point data for compression and processing thereof. In another embodiment, such a system may include a means for scanning at least one voxel of a point cloud composed of said point data in order to recover said compressed binary label which represents prototypical surface patches with respect to said at least one surface manifold. In another embodiment of such a system, the point data can include LIDAR point data and said surface manifolds can include LIDAR surface manifolds. In another embodiment of such a system, the LIDAR point data is capable of being represented as a voxel with at least one active grid element and at least one inactive grid element, wherein a voxel grid element is considered active if said voxel grid element contains within a spatial boundary thereof at least one LIDAR point. In yet another embodiment of such a system, the output of said voxel can include a sparse binary activation vector including grid elements that are active.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A system for feature extraction of surface manifolds, said system comprising:
   an optical remote sensor that measures a distance to and/or other properties of a target by illuminating said target with light, wherein said optical remote sensor provides sensor data indicative of at least one surface manifold and wherein point data is generated with respect to said at least one surface manifold; and
   an AHAH (Anti-Hebbian and Hebbian) based mechanism that performs an AHAH-based feature extraction operation on said point data for compression and processing thereof.

2. The system of claim 1 wherein said optical remote sensor comprises a LIDAR (Light Detection and Ranging) device.

3. The system of claim 1, further comprising scanning at least one voxel of a point cloud composed of said point data in order to recover said compressed binary label which represents prototypical surface patches with respect to said at least one surface manifold.

4. The system of claim 1 wherein said point data comprises LIDAR point data and said surface manifolds comprises LIDAR surface manifolds.

5. The system of claim 4 wherein said LIDAR point data is capable of being represented as a voxel with at least one active grid element and at least one inactive grid element, wherein a voxel grid element is considered active if said voxel grid element contains within a spatial boundary thereof at least one LIDAR point.

6. The system of claim 4 wherein said output of said voxel comprises a sparse binary activation vector including grid elements that are active.

7. The system of claim 1 further comprising a plurality of meta-stable switches, said AHAH based mechanism comprising said plurality of meta-stable switches.

8. The system of claim 7 wherein each meta-stable switch among said plurality of meta-stable switches comprises a self-organizing unit.

9. The system of claim 7 wherein each meta-stable switch among said plurality of meta-stable switches comprises a self-organizing node.

10. The system of claim 7 wherein said AHAH based mechanism comprises at least one memristor composed of said plurality of meta-stable switches.

11. The system of claim 1 wherein said AHAH based mechanism comprises at least one AHAH node comprising a plurality of synapses and associated feedback circuitry.

12. The system of claim 11 wherein said associated feedback circuitry acts on at least one of three electrode configurations including a 1-2 electrode configuration, a 2-1 electrode configuration, or a 2-2 electrode configuration.

* * * * *